United States Patent
Kim et al.

(10) Patent No.: US 12,266,978 B2
(45) Date of Patent: Apr. 1, 2025

(54) FLUX CONCENTRATE TYPE ROTOR AND MOTOR HAVING THE SAME

(71) Applicant: LG ELECTRONICS INC., Seoul (KR)

(72) Inventors: Jaeho Kim, Seoul (KR); Younggeun Min, Seoul (KR); Jiwan Lee, Seoul (KR); Kyungho Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 17/885,859

(22) Filed: Aug. 11, 2022

(65) Prior Publication Data

US 2023/0120874 A1    Apr. 20, 2023

(30) Foreign Application Priority Data

Oct. 14, 2021    (KR) .......................... 10-2021-0136881

(51) Int. Cl.
*H02K 1/276*    (2022.01)
*H02K 29/03*    (2006.01)

(52) U.S. Cl.
CPC ........... *H02K 1/2773* (2013.01); *H02K 29/03* (2013.01)

(58) Field of Classification Search
CPC ... H02K 1/2773; H02K 29/03; H02K 2213/03
USPC ........................................ 310/156.56, 156.57
See application file for complete search history.

(56) References Cited

U.S. PATENT DOCUMENTS

| | | | |
|---|---|---|---|
| 11,128,185 B2* | 9/2021 | Zhang | H02K 15/03 |
| 2015/0288233 A1* | 10/2015 | Kim | H02K 1/2766 |
| | | | 310/156.01 |
| 2018/0048200 A1 | 2/2018 | Jang et al. | |

FOREIGN PATENT DOCUMENTS

| | | | | |
|---|---|---|---|---|
| CN | 107394927 A | * | 11/2017 | ........... H02K 1/2773 |
| CN | 107735924 | | 2/2018 | |
| DE | 102013211858 A1 | * | 12/2014 | ............... H02K 1/17 |
| JP | 2014-230348 | | 12/2014 | |

(Continued)

OTHER PUBLICATIONS

Machine Translation of CN_107394927_A (Year: 2017).*

(Continued)

*Primary Examiner* — Quyen P Leung
*Assistant Examiner* — Charlie Frank Mann, Jr.
(74) *Attorney, Agent, or Firm* — KED & ASSOCIATES, LLP

(57) ABSTRACT

A flux concentrate type rotor may include a shaft; a rotor core; and an arc type permanent magnet having an inner diameter portion and an outer diameter portion. The rotor core includes an annular ring-shaped inner diameter portion core having a shaft through hole, a plurality of outer diameter portion cores arranged along a circumferential direction of the inner diameter portion core on an outer circumferential surface of the inner diameter portion core, and spaced apart from each other to form permanent magnet insertion portion, and a plurality of bridges arranged along the circumferential direction of the inner diameter portion core to correspond to each of the outer diameter portion cores, and connect each of the outer diameter portion cores to the inner diameter portion core. The outer diameter portion core has a first cutout portion positioned at a lower end.

19 Claims, 10 Drawing Sheets

(56) References Cited

FOREIGN PATENT DOCUMENTS

JP            2015-070721          4/2015

OTHER PUBLICATIONS

Machine Translation of DE_102013211858_A1 (Year: 2014).*
Extended European Search Report dated Dec. 22, 2022 issued in Application 22183247.0.
Korean Office Action dated Jan. 4, 2024, issued in Application No. 10-2021-0136881.
Korean Office Action dated Jul. 11, 2023 issued in Application No. 10-2021-0136881.

* cited by examiner

|  | Patent 1 | Patent 2 | First embodiment | Second embodiment | Third embodiment | Fourth embodiment |
|---|---|---|---|---|---|---|
| Magnet Usage | 100% | 100% | 100% | 100% | 100% | 100% |
| Counter electromotive force | 100% | 101% | 107% | 103% | 107% | 108% |

FLUX CONCENTRATE TYPE ROTOR AND MOTOR HAVING THE SAME

CROSS-REFERENCE TO RELATED APPLICATION

This application claims priority to and the benefit of Korean Patent Application No. 10-2021-0136881, filed in the Korean Intellectual Property Office on Oct. 14, 2021, the subject matter of which is incorporated herein by reference.

BACKGROUND

1. Field

The present disclosure relates to a flux concentrate type rotor and a motor having the same. More specifically, the present structure relates to a structure for reducing an amount of leakage flux in a flux concentrate rotor having an arc-type permanent magnet and a motor having the same.

2. Background

A motor is a machine that obtains rotational force from electrical energy, and includes a stator and a rotor. The rotor is configured to interact electromagnetically with the stator, and is rotated by a force acting between a magnetic field and a current flowing through a coil.

The motor using a permanent magnet to generate a magnetic field may be divided into a surface mounted motor and an interior permanent magnet motor based on a coupling structure of the permanent magnet installed in a rotor core. A surface-attached motor is a type of motor in which a permanent magnet is attached to a surface of a core of the rotor, and has relatively low noise and vibration and good rotational force. However, there may be disadvantages in that the permanent magnet may detach during high-speed rotation, the mechanical rigidity may be lowered, and control for diversification of the operation area may not be easy.

The permanent magnet embedded motor is a type of motor in which a permanent magnet is inserted and fixed through a buried hole penetrating up and down in the core, and may have a characteristic that torque and output are increased (as compared to a surface-attached motor) by adding a reluctance torque by a silent pole structure to an electromagnetic torque.

A flux concentrate type rotor has been developed, that improves motor efficiency by further improving torque and output. The flux concentrate type rotor may also be referred to as a spoke type motor. The flux concentrate type rotor has advantages that high torque and high output can be generated because the flux concentration is structurally high, and the rotor can be miniaturized for the same output. The flux concentrate type motor can be applied to driving motors such as washing machines or electric vehicles that require high torque and high output characteristics.

The flux concentrate type rotor may include a permanent magnet radially disposed about a shaft, and a rotor core provided to support permanent magnets and form a path of flux. The rotor core may be configured to include yokes disposed between the respective permanent magnets, and a cylindrical base positioned between the shaft and the permanent magnets and connected to each of the yokes.

In such a flux concentrate type rotor, some of the flux may leak toward the shaft through an inner diameter portion core of the rotor core. If the leakage flux increases, then the output inevitably decreases. Since the use of permanent magnets increases, it is disadvantageous in terms of material cost and miniaturization of the rotor.

Research is being conducted in various forms for reducing the leakage flux in the flux concentrate type rotor.

Chinese Patent No. CN201580078448 (hereinafter referred to as "Patent 1"), the subject matter of which is incorporated herein by reference, discloses a technique for reducing the leakage flux and reducing the weight of the rotor core by alternately stacking a first core layer and a second core layer to form the rotor core.

Patent 1 may be described with reference to FIGS. 1 and 2. The flux concentrate type rotor provided in the motor of Patent 1 comprises a shaft 1, a rotor core 2, and a permanent magnet 3 of a square bar type.

The rotor core 2 may be manufactured by laminating a plurality of thin steel plates, and may have a structure in which a plurality of permanent magnets 3 can be inserted therein. A central portion of an inner diameter portion core 11 of the rotor core 2 has a hole through which the shaft 1 can pass. The shaft 1 is fixed at the central portion of the inner diameter portion core 11 of the rotor core 2 to rotate together with the rotor core 2.

The rotor core 2 may be formed by alternately stacking two different core layers (i.e., a first core layer L1 and a second core layer L2). The first core layer L1 is disposed at the uppermost and lowermost ends of the rotor core 2.

The first core layer L1 has a support protrusion pattern in which the support protrusions 14 for supporting the permanent magnet 3 on the side surface of the inner diameter portion core 11 appear discontinuously in a direction of the rotation axis, and the second core layer L2 has a space portion 21 to prevent contact with the shaft 1 by removing the inner diameter portion core 11.

The rotor core composed of these first and second core layers L1 and L2 may reduce leakage flux, and more particularly, the leakage flux leaking toward the rotating shaft through the inner diameter portion core 11, and thus reduce the weight of the entire rotor.

The first core layer L1 includes an inner diameter portion core 11, an outer diameter portion core 12, a bridge 13 and a support protrusion 14.

In the center of the first core layer L1, an annular ring-shaped inner diameter portion core 11 having a shaft through hole formed therein is positioned. The shaft through hole is a hole in which the shaft 1 passes through and is fixed to.

A plurality of outer diameter portion cores 12 are arranged around the outer circumferential surface of the inner diameter portion core 11. The outer diameter portion core 12 may also be referred to as a yoke.

The shape and number of the outer diameter portion core(s) 12 may be variously changed. As an example, the first core layer L1 may include eight outer diameter portion cores 12 having a sectoral shape. Each of the outer diameter portion cores 12 may support the permanent magnet 3 and form a path for flux generated from the permanent magnet 3. The outer diameter portion cores 12 are arranged along the circumferential direction of the inner diameter portion core 11 and are spaced apart from each other to form permanent magnet insertion portion(s) 16 for accommodating the permanent magnets 3.

A through hole 17 may be formed in the outer diameter portion core 12, and a rivet may be inserted into the through hole 17 or a coupling protrusion of the rotor cover may be inserted into the through hole 17.

A first fixing protrusion 18 and a second fixing protrusion 19 protruding in an arc direction may be formed on both edges of the outer end of the outer diameter portion core 12. The first and second fixing protrusions 18 and 19 serve to fix the position of the permanent magnet together with the support protrusion 14, when the permanent magnet 3 is inserted into the permanent magnet insertion portion 16, and serve to prevent the permanent magnet from scattering when the rotor rotates.

The outer diameter portion cores 12 may be connected to the inner diameter portion core 11 via the bridges 13. The bridges 13 are arranged along the circumferential direction of the inner diameter portion core 11 corresponding to each outer diameter portion core 12. The bridges 13 may extend radially outward from an outer circumference of the inner diameter portion core 11 and may be connected to an inner end of the corresponding outer diameter portion core 12.

In a flux concentrate type rotor having this configuration, the first core layer L1 and the second core layer L2 are alternately stacked. Since the second core layer L2 does not include the inner diameter portion core and the bridge, due to the use of the second core layer L2, it is possible to reduce the leakage flux and reduce the weight of the flux concentrate type rotor.

The flux concentrate type rotor of Patent 1 has a complicated core stacking method, that lowers mass productivity. Since the second core layer L2 does not include the inner diameter portion core and the bridge, there may be a problem in that the coupling strength between the rotor core 2 and the shaft 1 is reduced, and the rotor core 2 is deformed when the shaft 1 is press-fitted.

Additionally, the bridge 13 connecting the outer diameter portion core 12 and the inner diameter portion core 11 starts at a point of a lower end 3a of the permanent magnet 3 and is connected to the inner diameter portion core 11, since the shape of the bridge 13 is not positioned in the center of the D-axis (minimum position of magnetic resistance), which is the center of the core, and it has a structure that increases the magnetic resistance of the leakage path. Thus, as shown in FIG. 3, there may be a problem in that a counter electromotive force is reduced because flux leakage occurs in the circular region (for example, the outer diameter portion core near the lower end of the permanent magnet and the bridge).

Additionally, since it adopts an open slot structure having the first fixing protrusion 18 and the second fixing protrusion 19 on both edges of the outer end of the outer diameter portion core 12, the force of the magnet scattering is concentrated on the first and second fixing protrusions 18 and 19. As such, there may be a problem in that mechanical rigidity is weak.

On the other hand, in an example of a flux concentrate type rotor having a bar type permanent magnet, there may be a limit in increasing a pole arc of the magnet due to shape of the permanent magnet.

A flux concentrate type rotor having an arc type permanent magnet is being developed that can increase the pole arc as compared to a bar type permanent magnet in the same rotor size. An example of a flux concentrate type rotor having an arc-type permanent magnet is disclosed in U.S. Pat. No. 11,128,185 (based on U.S. application Ser. No. 15/389,636 (hereinafter referred to as "Patent 2"), the subject matter of which is incorporated herein by reference.

FIG. 4 Is a diagram relating to Patent 2. Patent 2 has an effect of compensating for flux and reducing torque ripple by arranging an arc-type permanent magnet 23 having a C-shaped cross section curved in the tangential direction so that the weak flux surface and the strong flux surface face different surfaces.

However, as shown in FIG. 4, the flux concentrate type rotor of Patent 2 has a disadvantageous problem (as compared to the flux concentrate type rotor of Patent 1 having a bar type permanent magnet) in the amount of leakage flux generated in the area marked with a circle, for example, in the outer diameter protrusion core 32 and the bridge 33 near the lower end 23a of the permanent magnet 23.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
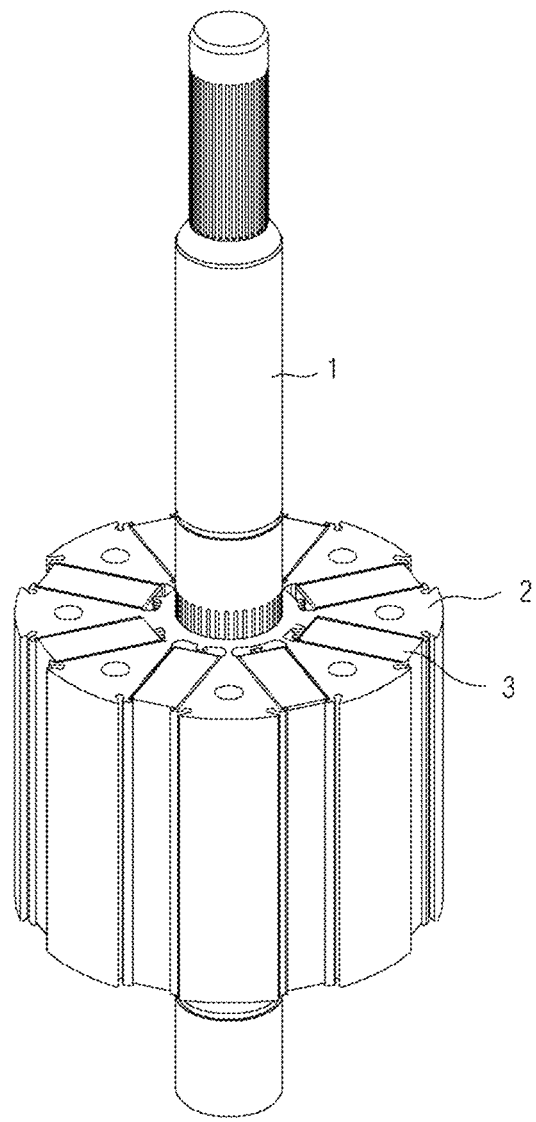
FIG. 1 is an external perspective view of a flux concentrate type rotor of Patent 1 having a permanent magnet of a square bar type.
Figure 2:
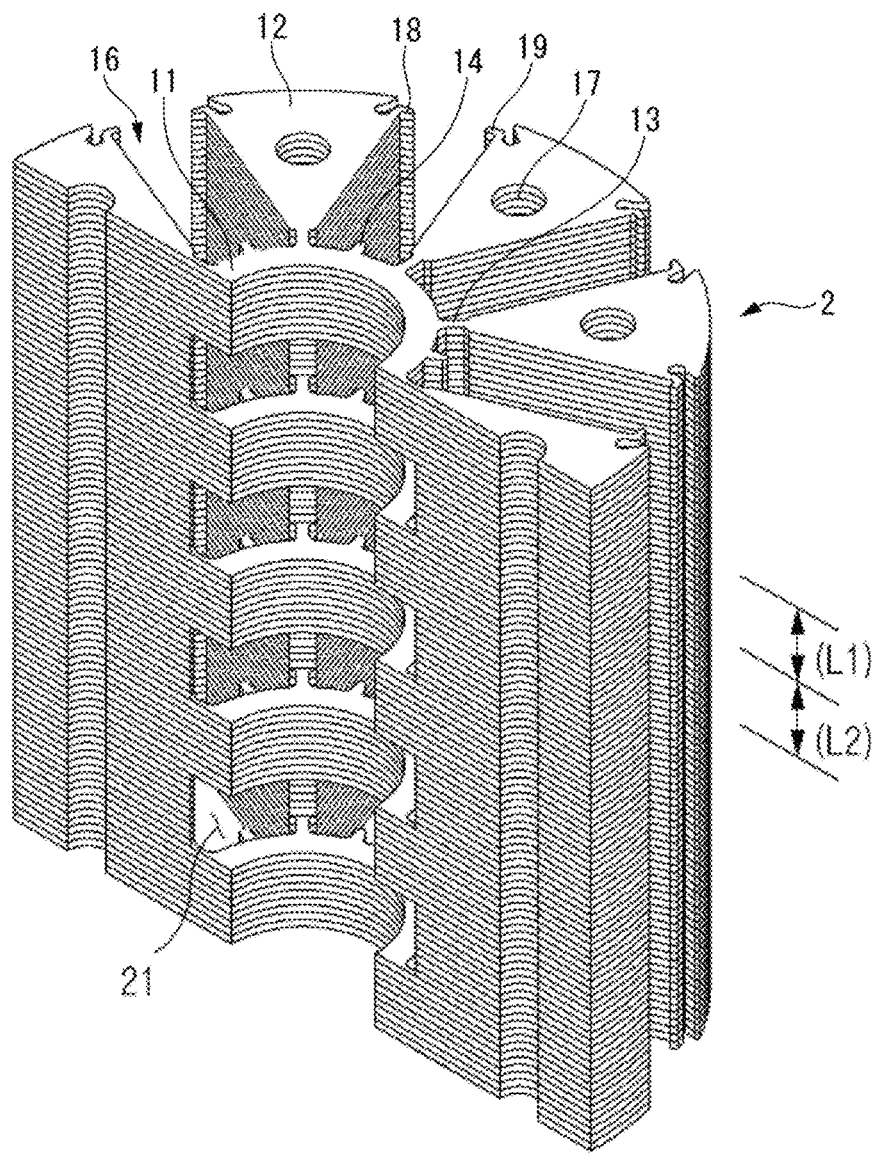
FIG. 2 is a cross-sectional perspective view showing a schematic configuration of a rotor core provided in the flux concentrate type rotor of FIG. 1.
Figure 3:
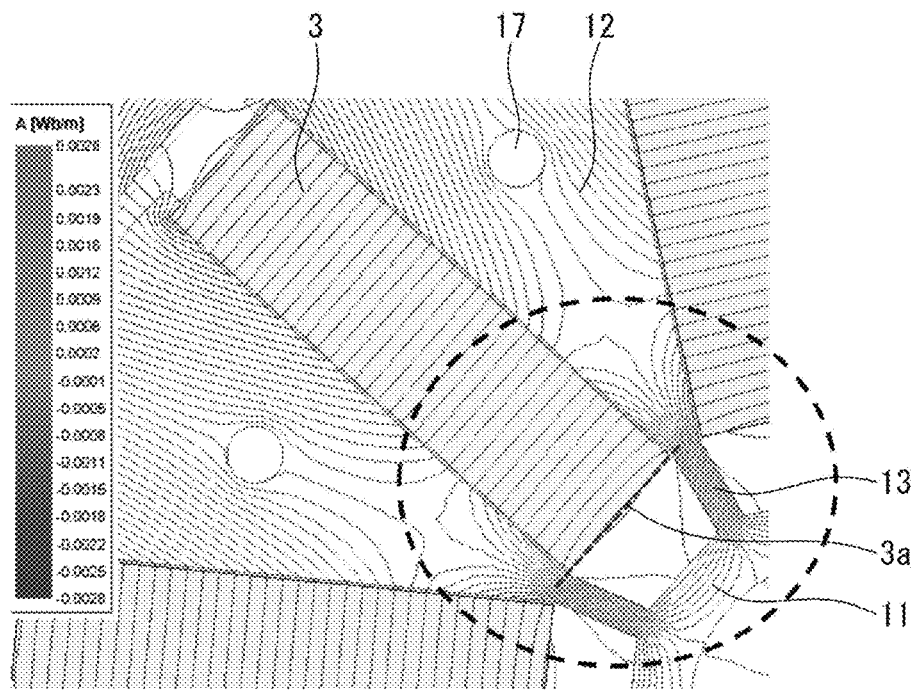
FIG. 3 is a diagram for explaining a leakage flux generated in a flux concentrate type rotor of FIG. 1.
Figure 4:
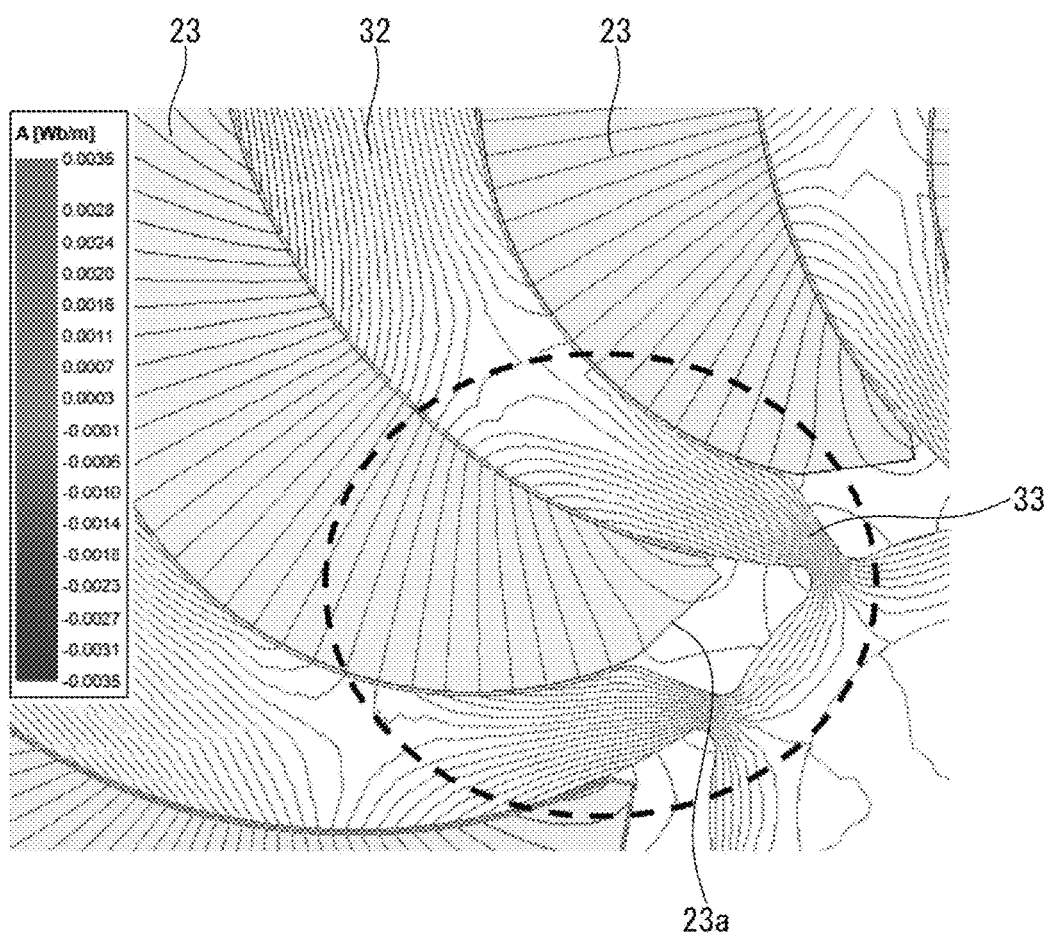
FIG. 4 is a diagram for explaining a leakage flux generated in a flux concentrate type rotor of Patent 2 having an arc-type permanent magnet.
Figure 5:
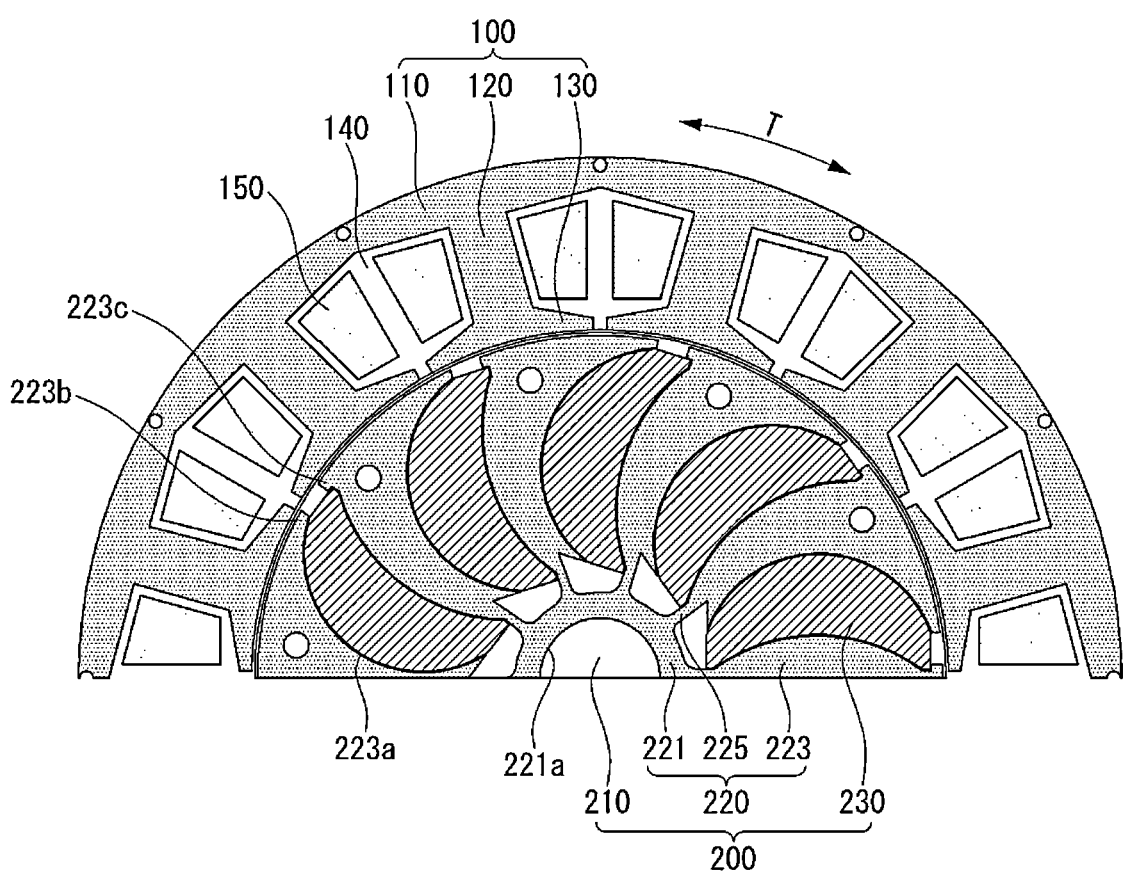
FIG. 5 is a diagram showing a schematic configuration of a motor having a flux concentrate type rotor according to a first embodiment of the present disclosure.
Figure 6:
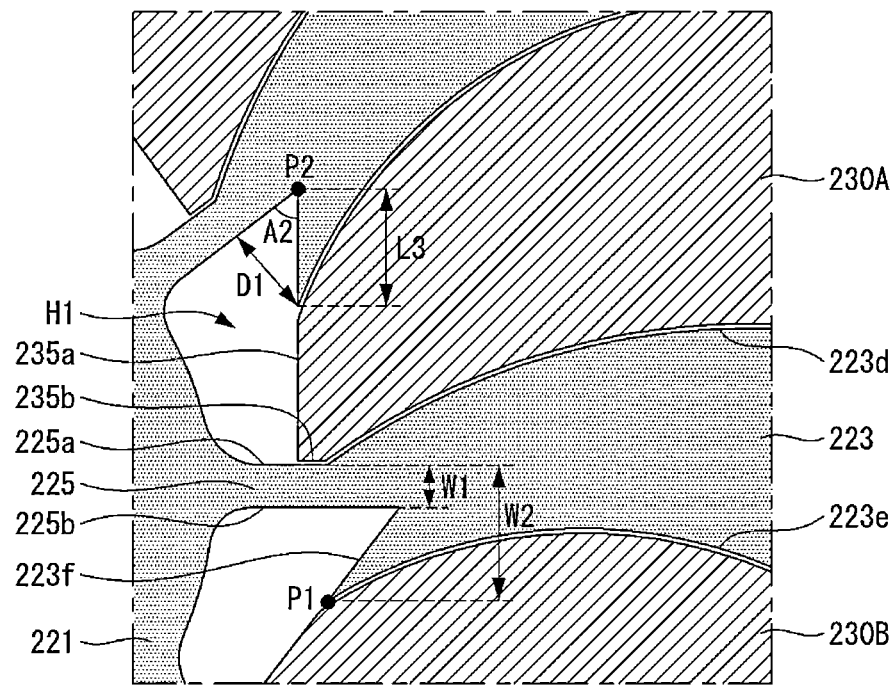
FIG. 6 is a diagram showing a schematic configuration of the rotor core shown in FIG. 5.
Figure 7:
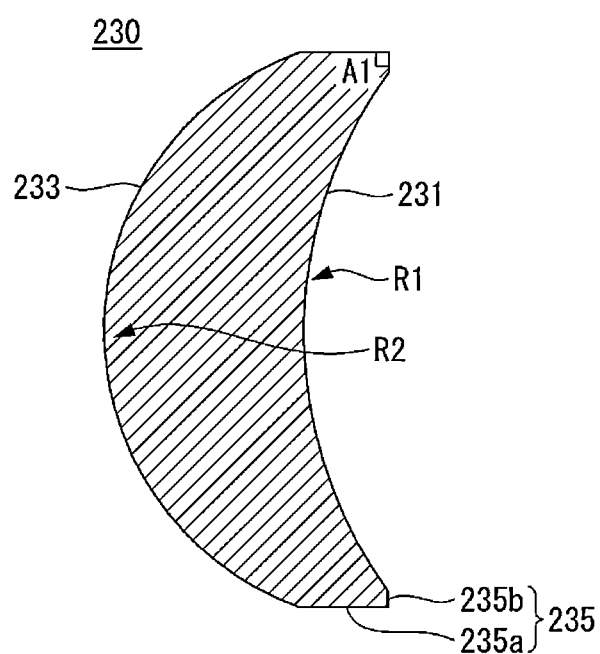
FIG. 7 is a diagram showing a schematic configuration of the permanent magnet shown in FIG. 5.

FIG. 5 is a diagram showing a schematic configuration of a motor having a flux concentrate type rotor according to a first embodiment of the present disclosure. FIG. 6 is a diagram showing a schematic configuration of a rotor core shown in FIG. 5. FIG. 7 is a diagram showing a schematic configuration of a permanent magnet shown in FIG. 5.

A motor having a flux concentrate type rotor according to a first embodiment of the present disclosure includes a stator 100 and a flux concentrate type rotor 200.

The stator 100 may include a stator core 110 and a plurality of teeth 120 projecting in a radial direction from the stator core 110. The stator core 110 may be formed to have an annular shape. A pole shoe 130 extending in both circumferential directions may be provided at an inner end of the teeth 120 in the radial direction. A slot 140 may be formed between the teeth 120. Accordingly, a coil 150 may be wound through the teeth 120 and the slot 140.

The flux concentrate type rotor 200 may include a shaft 210, a rotor core 220, and a permanent magnet 230. The permanent magnet 230 is an arc-type permanent magnet having an inner diameter portion 231 formed with a first curvature R1 and an outer diameter portion 233 formed with a second curvature R2.

In at least one example of the present disclosure, an arc-type permanent magnet may have the second curvature R2 of the outer diameter portion 233 be greater than the first curvature R1 of the inner diameter portion 231. This arrangement is not limited. That is, the second curvature R2 of the outer diameter portion 233 may be formed to be smaller than the first curvature R1 of the inner diameter portion 231.

The magnetization direction of each of the permanent magnets 230 proceeds in the tangential direction T such that the outer diameter portion 233 is formed to have a strong flux surface, and the inner diameter portion 231 is formed to have a weak flux surface.

The permanent magnet 230 may include a connecting portion 235 for connecting an end of the inner diameter portion 231 to an end of the outer diameter portion 233. The connecting portion 235 may include a first straight portion 235a connected to the end of the outer diameter portion 233, and a second straight portion 235b for connecting an end of the first straight portion 235a to the end of the inner diameter portion 231.

The first straight portion 235a and the second straight portion 235b may be formed to have an interior angle A1 of 90 degrees.

The rotor core 220 may include an inner diameter portion core 221, an outer diameter portion core 223 and a bridge 225. The inner diameter portion core 221 is formed in an annular ring shape to have a shaft through hole 221a into which the shaft 210 is inserted.

A plurality of outer diameter portion cores 223 are arranged along a circumferential direction (or tangential direction) of the inner diameter portion core 221 on an outer circumferential surface of the inner diameter portion core 221. The plurality of outer diameter portion cores 223 are disposed to be spaced apart from each other to form permanent magnet insertion portion(s) 223a for accommodating the arc-type permanent magnet(s) 230. The total number of outer diameter portion cores 223 may be variously changed.

A first fixing protrusion 223b and a second fixing protrusion 223c protruding in a circular arc direction may be formed on both edges of the outer end of the outer diameter portion core 223. The first and second fixing protrusions 223b and 223c may fix the position of the permanent magnet 230 when the arc-type permanent magnet 230 is inserted into the permanent magnet insertion portion 223a, and may serve to prevent the permanent magnet 230 from scattering based on rotation of the rotor 200.

The outer diameter portion core 223 has an open slot structure.

A plurality of bridges 225 are arranged along the circumferential direction of the inner diameter portion core 221 to correspond to each of the outer diameter portion cores 223, and the bridges 225 connect each of the outer diameter portion cores 223 to the inner diameter portion core 221.

The inner diameter portion core 221 is positioned radially inside the outer diameter portion core 223. Thus, the outer diameter portion core 223 may be referred to as an outer core, and the inner diameter portion core 221 may be referred to as an inner core. The outer diameter portion core 223 may also be referred to as a yoke.

In the permanent magnet insertion portion 223a, the arc-type permanent magnets 230 having the inner diameter portion 231 (having a weak flux surface) and the outer diameter portion 233 (having a strong flux surface) is disposed to face different sides from those adjacent to each other. Accordingly, the flux can be compensated and torque ripple can be reduced.

At a lower end of the arc-type permanent magnet 230, (i.e., between the first straight portion 235a of the permanent magnet 230 and the inner diameter portion core 221), a gap H1 partitioned by two bridges 225 adjacent to each other in the circumferential direction of the inner diameter portion core 221 is formed.

The outer diameter portion core 223 includes a first side 223d in contact with the inner diameter portion 231 of a first permanent magnet 230A (among two adjacent permanent magnets) and a second side 223e in contact with the outer diameter portion 233 of a second permanent magnet 230B (among the two permanent magnets). The outer diameter portion core 223 further includes a first cutout portion 223f positioned at a lower end of the outer diameter portion core 223.

The first cutout portion 223f is formed to extend from the end of the second side 223e of the outer diameter portion core 223 toward the first side 223d of the outer diameter portion core 223.

The bridge 225 includes a first side 225a extending from an end of the first side 223d of the outer diameter portion core 223 and connected to the inner diameter portion core 221, and a second side 225b positioned opposite to the first side 225a and connected to the inner diameter portion core 221.

The second side 225b of the bridge 225 is positioned to be spaced apart from the outer diameter portion 233 of the second permanent magnet 230B toward the first side 223d of the outer diameter portion core 223.

The lower end of the second permanent magnet 230B may be the first straight portion 235a.

A separation distance D1 of the second side 225b of the bridge 225 may be set to various values.

Based on this configuration, a portion of the first side 225a of the bridge 225 may be in contact with at least a portion of the connecting portion 235 of the first permanent magnet 230A, for example (the second straight portion 235b).

The first cutout portion 223f may extend toward the first side 223d of the outer diameter portion core 223 from a point P1 where the first straight portion 235a of the arc-type permanent magnet 230 is connected to a lower end of the second side 223e of the outer diameter portion core 223.

Figure 8:
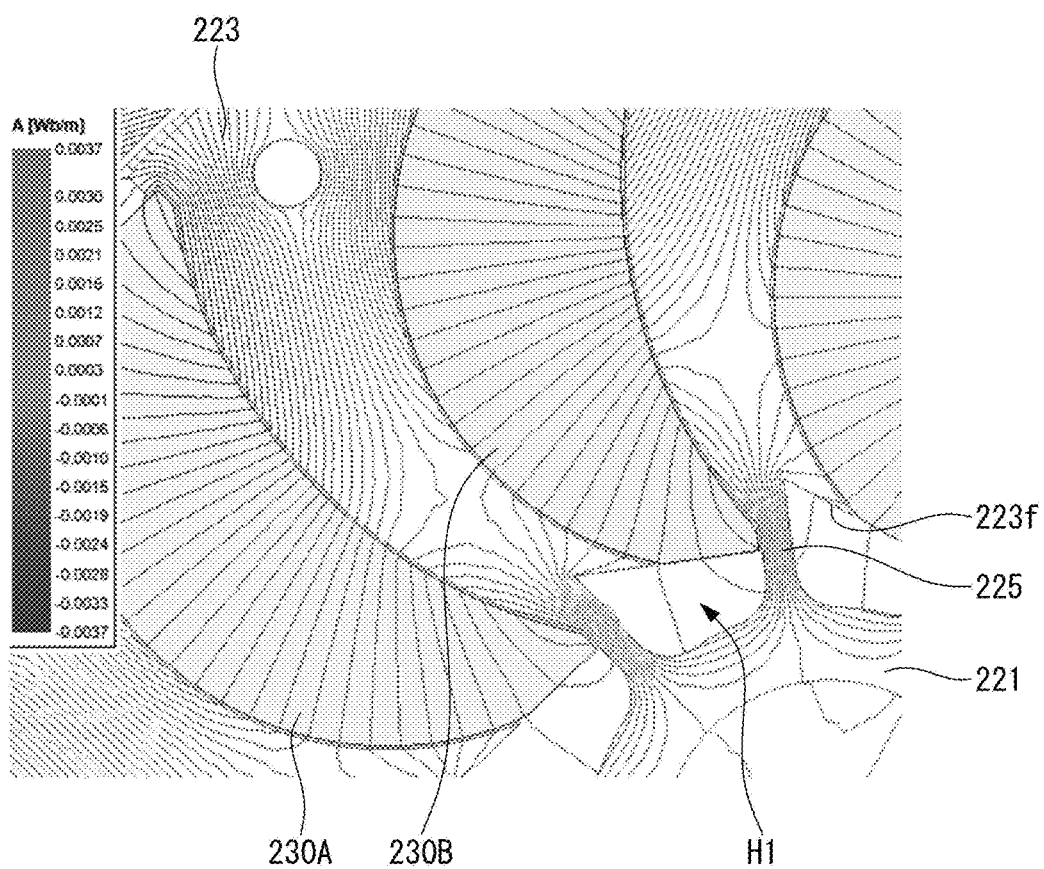
FIG. 8 is a diagram for explaining a leakage flux generated in the flux concentrate type rotor shown in FIG. 5.

As shown in FIGS. 5, 6 and 8, the first cutout portion 223f may extend toward the first side 223d of the outer diameter portion core 223 from the point P1 where the first straight portion 235a of the arc-type permanent magnet 230 is connected to a lower end of the second side 223e of the outer diameter portion core 223, and may extend parallel to at least a portion of the connecting portion 235 of the arc-type permanent magnet 230 (for example, the first straight portion 235a).

The second side 225b of the bridge 225 extends from the end of the first cutout portion 223f and is connected to the inner diameter portion core 221.

The separation distance D1 of the second side 225b of the bridge 225 may be shorter than a length L3 of the first cutout portion 223f.

A point P2 where the second side 225b of the bridge 225 is connected to the end of the first cutout portion 223f may be positioned radially outward from the first straight portion 235a of the permanent magnet 230.

A maximum width W1 of the bridge 225 is formed smaller than a width W2 of the lower end of the outer diameter portion core 223.

In order to effectively reduce the amount of leakage flux, the first cutout portion 223f and the second side 225b of the bridge 225 may form a right angle or an acute angle A2.

In FIGS. 5, 6 and 8, the first cutout portion 223f and the second side 225b of the bridge 225 may form an acute angle.

Based on this configuration, as shown in FIG. 8, due to the first cutout portion 223f provided at the lower end of the outer diameter portion core 223, the second side 225b of the bridge 225 is positioned to be spaced apart from the outer diameter portion 233 of the permanent magnet 230B toward the first side 223d of the outer diameter portion core 223.

Therefore, the magnetic resistance increases because the leakage path is relatively increased as compared to the flux concentrate type rotor of Patent 2 using the arc type permanent magnet, and since the flux is bent and flows due to the first cutout portion 223f, the amount of leakage flux through the bridge 225 is reduced.

Additionally, since the arc-type permanent magnet is used, the flux and efficiency are increased as compared to the bar-type permanent magnet, and even if the open slot structure is adopted, the force of magnet scattering is effectively dispersed as compared to the bar-type permanent magnet, and the mechanical rigidity of the rotor core is increased.

A rotor core provided in a flux concentrate type rotor according to another embodiment of the present disclosure may be described. In the following description, the same reference numerals may be given to the same elements as those of the first embodiment described above. A further detailed description may be omitted.

Figure 9:
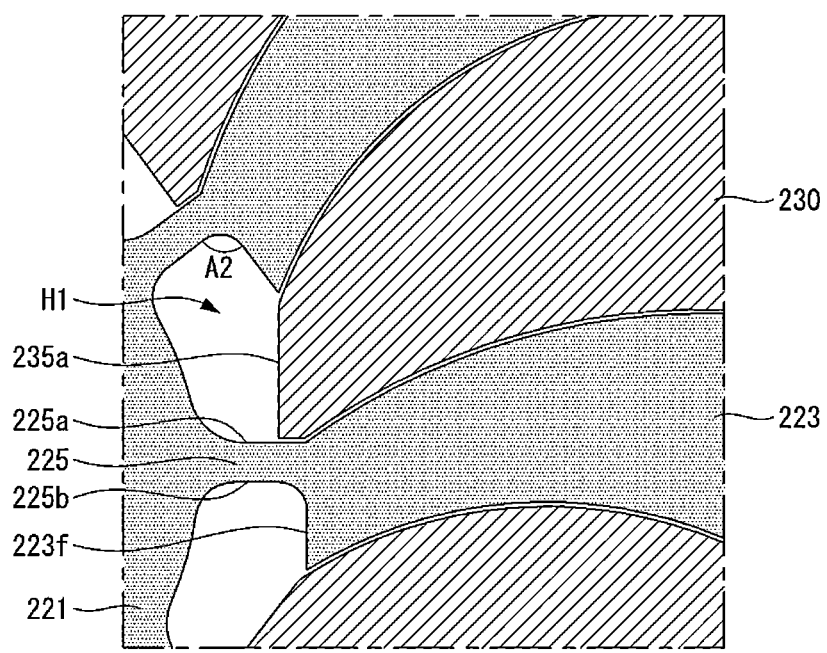
FIG. 9 is a diagram showing a schematic configuration of a rotor core provided in a flux concentrate type rotor according to a second embodiment of the present disclosure.

FIG. 9 is a diagram showing a schematic configuration of a rotor core provided in a flux concentrate type rotor according to a second embodiment. In FIG. 9, the first cutout portion 223f is formed by being bent toward the inner diameter portion core 221, as compared to the first embodiment (described above).

In the above-described first embodiment, the first cutout portion 223f extends from the first straight portion 235a of the permanent magnet 230, and adopts a configuration extending parallel to at least a portion of the connecting portion 235 of the permanent magnet 230 (for example, the first straight portion 235a).

However, the first cutout portion 223f may be formed by being bent toward the inner diameter portion core 221, as compared to the first embodiment (described above).

In the present embodiment, the angle A2 between the first cutout portion 223f and the second side 225b of the bridge 225 may approximately form a right angle.

Figures 11, 12:
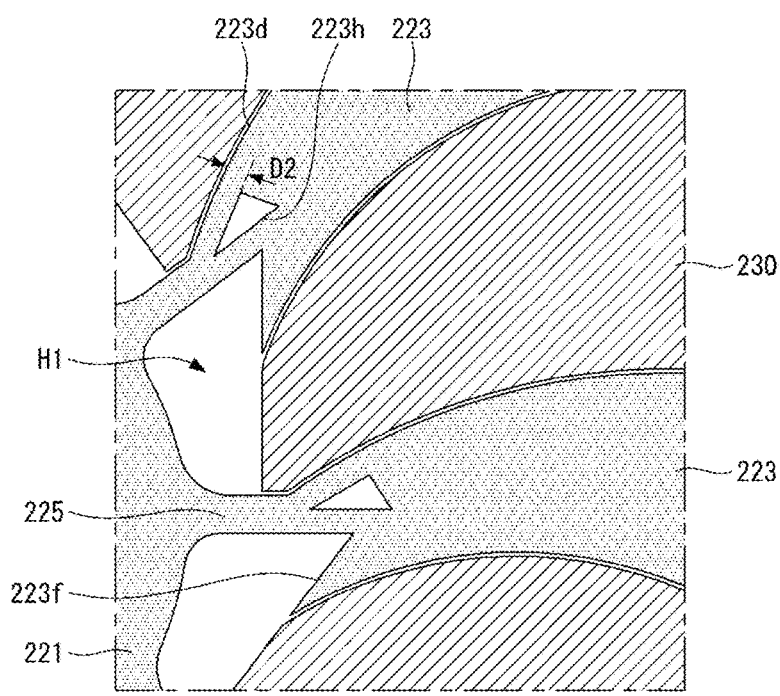
FIG. 11 is a diagram showing a schematic configuration of a rotor core provided in a flux concentrate type rotor according to a fourth embodiment of the present disclosure.
FIG. 12 is a table showing results of measuring a counter electromotive force of each example when a flux concentrate type rotor according to Prior Patent 1 and 2 and a flux concentrate type rotor according to embodiments of the present disclosure have the same magnet usage.

Referring to FIG. 12, when the magnet usage and counter electromotive force in the flux concentrate type rotor of Patent 1 are each 100%, in the flux concentrate type rotor of Patent 2, the counter electromotive force can be improved by 1% as compared to the flux concentrate type rotor of Patent 1, but in the flux concentrate type rotor of the present embodiment, the counter electromotive force can be improved by 3% as compared to the flux concentrate type rotor of Patent 1.

Additionally, in the flux concentrate type rotor of the first embodiment described above, the counter electromotive force can be improved by 7% as compared to the flux concentrate type rotor of Patent 1.

Therefore, referring to FIG. 12, since it is desirable to increase the leakage path in order to effectively improve the counter electromotive force, it can be seen that it is desirable to form a small angle A2 between the first cutout portion 223f and the second side 225d of the bridge 225.

Figure 10:
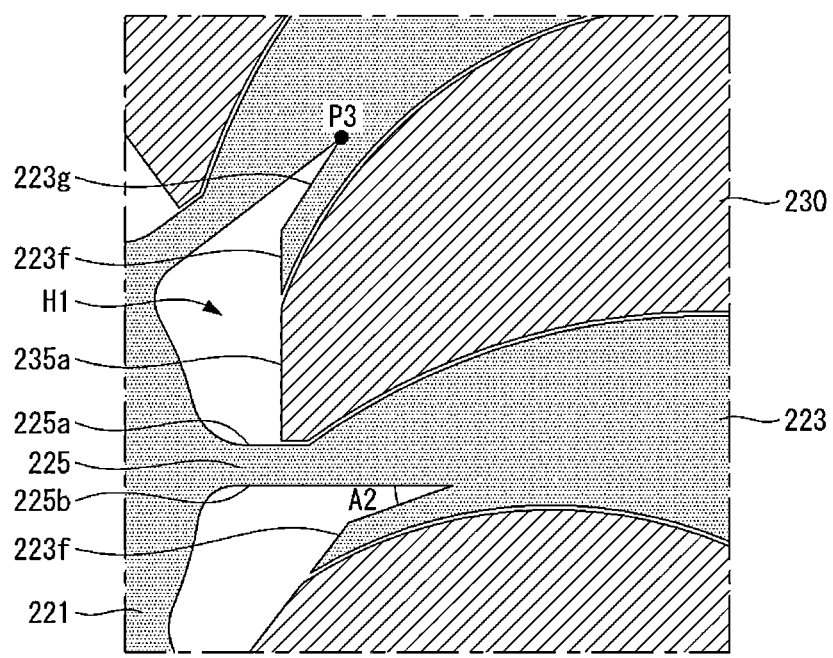
FIG. 10 is a diagram showing a schematic configuration of a rotor core provided in a flux concentrate type rotor according to a third embodiment of the present disclosure.

FIG. 10 is a diagram showing a schematic configuration of a rotor core provided in a flux concentrate type rotor according to a third embodiment. The outer diameter portion core provided in the flux concentrate type rotor of the present embodiment may further include a second cutout portion 223g extending radially outward from an end of the first cutout portion 223f extending parallel to at least a portion of the connecting portion 235 of the permanent magnet 230 (for example, the first straight part 235a), and the second side 225b of the bridge 225 extends from an end of the second cutout portion 223g and is connected to the inner diameter portion core 221.

Additionally, the angle A2 between the second cutout portion 223g and the second side 225b of the bridge 225 forms an acute angle, and the point P3 where the second side 225b of the bridge 225 and the end of the second cutout portion 223g are connected is radially outward than the first straight portion 235a of the permanent magnet 230.

Therefore, the flux concentrate type rotor of the present embodiment has a relatively increased leakage path as compared to the Patents 1 and 2 and the first and second embodiments of the present disclosure, and thus the counter electromotive force can be further improved.

Referring to FIG. 12, in the flux concentrate type rotor of the present embodiment, the counter electromotive force can be improved by 7% as compared to the flux concentrate type rotor of Patent 1.

FIG. 11 is a diagram showing a schematic configuration of a rotor core provided in a flux concentrate type rotor according to a fourth embodiment.

The rotor core provided in the flux concentrate type rotor of the present embodiment forms a hole 223h in the outer diameter portion core 223 of the rotor core of the first embodiment (described above), so that it discloses a configuration to generate local saturation at the lower end portion of the outer diameter portion core 223.

In order to effectively generate local saturation on the leakage path of the outer diameter portion core 223, the distance D2 between the first side 223d of the outer diameter portion core 223 and the hole 223h is preferably maintained at about 0.5 mm.

Referring to FIG. 12, in the flux concentrate type rotor of the present embodiment, the counter electromotive force can be improved by 8% as compared to the flux concentrate type rotor of Patent 1.

On the other hand, the hole 223h is also applicable to the outer diameter portion core provided in the other embodiments described above.

A technical problem to be solved by the present disclosure is to provide a flux concentrate type rotor that can reduce an amount of leakage flux while increasing an effective flux by having an arc-type permanent magnet that can increase the magnetic pole arc length.

A technical problem to be solved by the present disclosure is to provide a flux concentrate type rotor with increased mechanical rigidity by effectively dispersing a force of magnet scattering while employing an open slot structure.

A technical problem to be solved by the present disclosure is to provide a motor having the above-described flux concentrate type rotor.

The technical problems to be achieved from the present disclosure are not limited to the technical problems mentioned above, and other technical problem which are not mentioned above can be clearly understood from the following description by those skilled in the art to which the present disclosure pertains.

A flux concentrate type rotor according to an aspect of the present disclosure may comprise a shaft; a rotor core; and an arc type permanent magnet having an inner diameter portion and an outer diameter portion, wherein the rotor core may include an annular ring-shaped inner diameter portion core having a shaft through hole into which the shaft is inserted, a plurality of outer diameter portion cores arranged along a circumferential direction of the inner diameter portion core on an outer circumferential surface of the inner diameter portion core, and spaced apart from each other to form permanent magnet insertion portion for accommodating the permanent magnet, and a plurality of bridges arranged along the circumferential direction of the inner diameter portion core to correspond to each of the outer diameter portion cores, and connect each of the outer diameter portion cores to the inner diameter portion core, and wherein the outer diameter portion core may have a first cutout portion positioned at a lower end.

The outer diameter portion core includes a first side in contact with an inner diameter portion of a first permanent magnet of two adjacent permanent magnets and a second side in contact with an outer diameter portion of a second permanent magnet positioned opposite the first side of the two permanent magnets, and the first cutout portion is formed extending from an end of the second side of the outer diameter portion core toward the first side.

In addition, the bridge includes a first side extending from an end of the first side of the outer diameter portion core and connected to the inner diameter portion core, and a second side positioned opposite a first side of the bridge and connected to the inner diameter portion core.

Accordingly, the second side of the bridge is positioned to be spaced apart from the end of the outer diameter portion of the second permanent magnet toward the first side of the outer diameter portion core.

Based on the flux concentrate type rotor according to the embodiment of the present disclosure, due to the first cutout portion provided at the lower end of the outer diameter portion core, a second side of the bridge is positioned to be spaced apart from the end of the outer diameter portion of the second permanent magnet toward the first side of the outer diameter portion core.

Based on this configuration, the magnetic resistance increases because the leakage path is relatively increased compared to the flux concentrate type rotor of prior patent 2 using the arc type permanent magnet, and since the flux is bent and flows due to the first cutout portion, the amount of leakage flux through the bridge is reduced.

Accordingly, it is possible to increase the counter electromotive force of the motor, improve the performance of the motor, and increase the output density of the motor.

In addition, since the arc-type permanent magnet is used, the flux and efficiency are increased compared to the bar-type permanent magnet, and even if the open slot structure is adopted, the force of magnet scattering is effectively dispersed compared to the bar-type permanent magnet, so that the mechanical rigidity of the rotor core is increased.

The inner diameter portion of the first and second permanent magnets may be formed to have a first curvature, the outer diameter portion of the first and second permanent magnets may be formed to have a second curvature.

The second curvature may be greater than the first curvature.

The first and second permanent magnets may further include a connecting portion connecting an end of the inner diameter portion and an end of the outer diameter portion.

The connecting portion may include a first straight portion connected to the end of the outer diameter portion, and a second straight portion connecting an end of the first straight portion and the end of the inner diameter portion.

The first straight portion and the second straight portion may have an interior angle of 90 degrees.

A portion of the first side of the bridge may be in contact with at least a portion of the connecting portion of the first permanent magnet.

The first cutout portion may extend from a point where the first straight portion of the permanent magnet and a lower end of the second side of the outer diameter portion core are connected toward the first side of the outer diameter portion core.

The second side of the bridge may extend from an end of the first cutout portion and connect to the inner diameter portion core.

A portion where the second side of the bridge and the end of the first cutout portion are connected may be positioned radially outward from the first straight portion of the first permanent magnet.

The first cutout portion and the second side of the bridge may form an acute angle.

The first cutout portion may be parallel to at least a portion of the connecting portion of the permanent magnet.

The outer diameter portion core may further include a second cutout portion extending radially outward from the end of the first cutout portion.

The second side of the bridge may extend from an end of the second cutout portion and connect to the inner diameter portion core.

A portion where the second side of the bridge and the end of the second cutout portion are connected may be positioned radially outward from the first straight portion of the first permanent magnet.

The second cutout portion and the second side of the bridge may form an acute angle.

The first cutout portion may be formed parallel to at least a portion of the connecting portion of the permanent magnet.

The motor according to the present disclosure may include the flux concentrate type rotor described above.

A flux concentrate type rotor according to another aspect of the present disclosure may comprise a shaft; a rotor core; and an arc type permanent magnet having an inner diameter portion and an outer diameter portion, wherein the rotor core may include an annular ring-shaped inner diameter portion core having a shaft through hole into which the shaft is inserted, a plurality of outer diameter portion cores arranged along a circumferential direction of the inner diameter portion core on an outer circumferential surface of the inner diameter portion core, and spaced apart from each other to form permanent magnet insertion portion for accommodating the permanent magnet, and a plurality of bridges arranged along the circumferential direction of the inner diameter portion core to correspond to each of the outer diameter portion cores, and connect each of the outer diameter portion cores to the inner diameter portion core, and wherein a first side of the bridge may extend from an end of an inner diameter portion of a first permanent magnet among the first and second permanent magnets adjacent to each other with the outer diameter portion core interposed therebetween and may be connected to the inner diameter portion core, and a second side of the bridge may be positioned to be spaced apart from an end of an outer diameter portion of the second permanent magnet toward the first side of the bridge.

The inner diameter portion of the first and second permanent magnets may be formed to have a first curvature, the outer diameter portion of the first and second permanent magnets may be formed to have a second curvature.

The second curvature may be greater than the first curvature.

The first and second permanent magnets may further include a connecting portion connecting the end of the inner diameter portion and the end of the outer diameter portion.

The connecting portion may include a first straight portion connected to the end of the outer diameter portion, and a second straight portion connecting an end of the first straight portion and the end of the inner diameter portion.

The first straight portion and the second straight portion may have an interior angle of 90 degrees.

A portion of the first side of the bridge may be in contact with at least a portion of the connecting portion of the first permanent magnet.

An upper end of the second side of the bridge may be positioned radially outward from the first straight portion of the first permanent magnet.

The motor according to the present disclosure may include the above-described flux concentrate type rotor.

Effects obtainable from the present disclosure are not limited by the effects mentioned above, and other effects which are not mentioned above can be clearly understood from the following description by those skilled in the art to which the present disclosure pertains.

It is apparent to those skilled in the art that the present disclosure may be embodied in other specific forms without departing from the essential characteristics of the present disclosure. Accordingly, the above detailed description should not be construed as restrictive in all respects but should be considered as illustrative. The scope of the present disclosure should be determined by reasonable interpretation of the appended claims, and all changes within the equivalent scope of the present disclosure are included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flux concentrate type rotor comprising:
a shaft;
a rotor core; and first and second permanent magnets each provided in an arc shape and having an inner diameter portion and an outer diameter portion, wherein the rotor core includes:
an annular ring-shaped inner diameter portion core having a shaft through hole to receive the shaft,
a plurality of outer diameter portion cores arranged along a circumferential direction of the inner diameter portion core on an outer circumferential surface of the inner diameter portion core, and the outer diameter portion cores includes first and second outer diameter portion cores that are spaced apart from each other to form a permanent magnet insertion portion for accommodating the first permanent magnet, and
a plurality of bridges arranged along the circumferential direction of the inner diameter portion core to correspond to each of the outer diameter portion cores, and the bridges to connect each of the outer diameter portion cores to the inner diameter portion core, and
wherein the first outer diameter portion core includes a first cutout portion positioned at a lower end of the first outer diameter portion core,
wherein the outer diameter portion cores are formed with an open slot structure,
wherein the flux concentrate type rotor further comprises a gap partitioned by two bridges adjacent to each other in the circumferential direction of the inner diameter portion core, and a part of the first permanent magnet is exposed to the gap,
wherein the first outer diameter portion core includes a first side in contact with the inner diameter portion of the first permanent magnet and a second side in contact with the outer diameter portion of the second permanent magnet, and
wherein the first cutout portion of the first outer diameter portion core extends from an end of the second side of the first outer diameter portion core toward the first side of the first outer diameter portion core, and is connected with the gap.

2. The flux concentrate type rotor of claim 1, wherein the plurality of bridges includes a first bridge, the first bridge includes a first side extending from an end of the first side of the first outer diameter portion core and connected to the inner diameter portion core, and a second side positioned opposite the first side of the first bridge and connected to the inner diameter portion core, and
the second side of the first bridge is spaced apart from the second side of the first outer diameter portion core toward the first side of the first outer diameter portion core.

3. The flux concentrate type rotor of claim 2, wherein the inner diameter portion of the first and second permanent magnets have a first curvature, and the outer diameter portion of the first and second permanent magnets have a second curvature, and
the second curvature is greater than the first curvature.

4. The flux concentrate type rotor of claim 3, wherein each of the first and second permanent magnets includes a connecting portion connecting an end of the inner diameter portion and an end of the outer diameter portion,
the connecting portion includes a first straight portion connected to the end of the outer diameter portion, and a second straight portion connecting an end of the first straight portion and the end of the inner diameter portion, and
the first straight portion and the second straight portion have an interior angle of 90 degrees.

5. The flux concentrate type rotor of claim 4, wherein a portion of the first side of the first bridge is in contact with at least a portion of the connecting portion of the first permanent magnet.

6. The flux concentrate type rotor of claim 4, wherein the first cutout portion extends from a point, where the first straight portion of the second permanent magnet connects to a lower end of the second side of the first outer diameter portion core, toward the first side of the first outer diameter portion core, and
the second side of the first bridge extends from an end of the first cutout portion toward the inner diameter portion core.

7. The flux concentrate type rotor of claim 6, wherein a portion where the second side of the first bridge and the end of the first cutout portion are connected is positioned radially outward from the first straight portion of the second permanent magnet, and
the first cutout portion of the first outer diameter portion core and the second side of the first bridge form an acute angle.

8. The flux concentrate type rotor of claim 6, wherein the first cutout portion is parallel to at least a portion of the connecting portion of the second permanent magnet.

9. The flux concentrate type rotor of claim 6, wherein the first outer diameter portion core includes a second cutout portion extending radially outward from the end of the first cutout portion, and
the second side of the first bridge extends from an end of the second cutout portion toward the inner diameter portion core.

10. The flux concentrate type rotor of claim 9, wherein a portion where the second side of the first bridge connects to the end of the second cutout portion is positioned radially outward from the first straight portion of the second permanent magnet, and
the second cutout portion and the second side of the first bridge form an acute angle.

11. The flux concentrate type rotor of claim 9, wherein the first cutout portion of the first outer diameter portion core is parallel to at least a portion of the connecting portion of the second permanent magnet.

12. A flux concentrate type rotor comprising:
a shaft;
a rotor core; and
first and second permanent magnets each provided in an arc shape and having an inner diameter portion and an outer diameter portion,
wherein the rotor core includes:
an annular ring-shaped inner diameter portion core having a shaft through hole to receive the shaft,
a plurality of outer diameter portion cores arranged along a circumferential direction of the inner diameter portion core on an outer circumferential surface of the inner diameter portion core, and the outer diameter portion cores includes first and second outer diameter portion cores that are spaced apart from each other to form a permanent magnet insertion portion for accommodating the first permanent magnet, and
a plurality of bridges arranged along the circumferential direction of the inner diameter portion core to correspond to each of the outer diameter portion cores, and the bridges to connect each of the outer diameter portion cores to the inner diameter portion core, and wherein the first outer diameter portion core includes a first cutout portion positioned at a lower end of the first outer diameter portion core, wherein the outer diameter portion cores are formed with an open slot structure, wherein the flux concentrate type rotor further comprises a gap partitioned by two bridges adjacent to each other in the circumferential direction of the inner diameter portion core, and a part of the first permanent magnet is exposed to the gap, wherein the first outer diameter portion core includes a first side in contact with the inner diameter portion of the first permanent magnet and a second side in contact with the outer diameter portion of the second permanent magnet, and wherein the first cutout portion of the first outer diameter portion core extends from an end of the second side of the first outer diameter portion core toward the first side of the first outer diameter portion core, and is connected with the gap, and wherein a first side of a first bridge of the plurality of bridges extends from an end of the inner diameter portion of the first permanent magnet and is connected to the inner diameter portion core, and a second side of the first bridge is positioned to be spaced apart from an end of the outer diameter portion of the second permanent magnet by a length of the first cutout portion toward the first side of the first bridge.

13. The flux concentrate type rotor of claim 12, wherein the inner diameter portion of the first and second permanent magnets are formed to have a first curvature, the outer diameter portion of the first and second permanent magnets are formed to have a second curvature, and the second curvature is greater than the first curvature.

14. The flux concentrate type rotor of claim 13, wherein each of the first and second permanent magnets includes a connecting portion connecting the end of the inner diameter portion and the end of the outer diameter portion.

15. The flux concentrate type rotor of claim 14, wherein the connecting portion includes a first straight portion connected to the end of the outer diameter portion, and a second straight portion connecting an end of the first straight portion and the end of the inner diameter portion.

16. The flux concentrate type rotor of claim 15, wherein the first straight portion and the second straight portion have an interior angle of 90 degrees.

17. The flux concentrate type rotor of claim 16, wherein a portion of the first side of the first bridge is in contact with at least a portion of the connecting portion of the first permanent magnet.

18. The flux concentrate type rotor of claim 12, wherein an upper end of the second side of the first bridge is positioned radially outward from the first straight portion of the first permanent magnet.

19. A motor comprising the flux concentrate type rotor according to claim 18.

* * * * *